(12) United States Patent
Seong et al.

(10) Patent No.: US 9,196,882 B2
(45) Date of Patent: Nov. 24, 2015

(54) BATTERY PACK OF COMPACT STRUCTURE

(71) Applicant: LG CHEM, LTD., Seoul (KR)

(72) Inventors: JunYeob Seong, Daejeon (KR);
BumHyun Lee, Seoul (KR); Jong Moon Yoon, Daejeon (KR)

(73) Assignee: LG CHEM. LTD., Seoul (KR)

( * ) Notice: Subject to any disclaimer, the term of this patent is extended or adjusted under 35 U.S.C. 154(b) by 249 days.

(21) Appl. No.: 13/870,274

(22) Filed: Apr. 25, 2013

(65) Prior Publication Data
US 2013/0236751 A1   Sep. 12, 2013

Related U.S. Application Data

(63) Continuation of application No. PCT/KR2011/008321, filed on Nov. 3, 2011.

(30) Foreign Application Priority Data

Nov. 22, 2010   (KR) ........................ 10-2010-0115963

(51) Int. Cl.
*H01M 2/24* (2006.01)
*H01M 2/10* (2006.01)
*H01M 2/20* (2006.01)
*H01M 10/04* (2006.01)

(52) U.S. Cl.
CPC .......... *H01M 2/1072* (2013.01); *H01M 2/1077* (2013.01); *H01M 2/206* (2013.01); *H01M 10/0481* (2013.01)

(58) Field of Classification Search
CPC . H01M 2/1077; H01M 2/1072; H01M 2/206; H01M 10/0481
See application file for complete search history.

(56) References Cited

U.S. PATENT DOCUMENTS

| | | | |
|---|---|---|---|
| 2010/0136420 A1* | 6/2010 | Shin et al. | 429/178 |
| 2010/0266880 A1* | 10/2010 | Hirakawa et al. | 429/53 |
| 2011/0165451 A1* | 7/2011 | Kim et al. | 429/153 |
| 2011/0262801 A1* | 10/2011 | Schwab | 429/163 |

FOREIGN PATENT DOCUMENTS

| | | |
|---|---|---|
| CN | 101517784 A | 8/2009 |
| JP | 2002-141036 A | 5/2002 |

(Continued)

OTHER PUBLICATIONS

International Search Report for PCT/KR2011/008321 mailed May 29, 2012.

*Primary Examiner* — Raymond Alejandro
(74) *Attorney, Agent, or Firm* — Birch, Stewart, Kolasch & Birch, LLP (57) ABSTRACT

Disclosed herein is a battery pack including (a) a battery module assembly arranged in a lateral direction, (b) a pair of a front support member and a rear support member to cover the front and rear of outermost battery modules of the battery module assembly, (c) at least one upper end connection member to connect the front support member and the rear support member to each other at the upper end of the battery module assembly, and (d) at least one lower end connection member to connect the front support member and the rear support member to each other at the lower end of the battery module assembly, wherein the cartridge is provided at the lower end thereof with a fastening hole, via which the at least one lower end connection member is mounted.

21 Claims, 8 Drawing Sheets

(56) References Cited

FOREIGN PATENT DOCUMENTS

| | | |
|---|---|---|
| JP | 2006-172882 A | 6/2006 |
| JP | 2006-190530 A | 7/2006 |
| JP | 2007-66761 A | 3/2007 |
| JP | 2008-282639 A | 11/2008 |
| JP | 2009-21067 A | 1/2009 |
| JP | 2009-277647 A | 11/2009 |
| KR | 10-2007-0025734 A | 3/2007 |
| KR | 10-0709263 B1 | 4/2007 |
| KR | 10-2008-00270506 A | 3/2008 |
| KR | 10-2008-0038467 A | 5/2008 |
| KR | 10-2010-0003146 A | 1/2010 |

* cited by examiner

BATTERY PACK OF COMPACT STRUCTURE

This application is a Continuation of PCT International Application No. PCT/KR2011/008321 filed on Nov. 3, 2011, which claims priority under 35 U.S.C 119(a) to Application No. 10-2010-0115963 filed in Republic of Korea on Nov. 22, 2010, all of which are hereby expressly incorporated by reference into the present application.

TECHNICAL FIELD

The present invention relates to a battery pack having a compact structure, and, more particularly, to a battery pack including (a) a battery module assembly having a structure in which two or more battery modules, each of which includes a plurality of unit modules, each of which includes two or more battery cells, mounted in a cartridge in a state in which the unit modules are connected in series and/or parallel to each other, are arranged in a lateral direction such that the battery modules are disposed in tight contact with each other or adjacent to each other in a state in which the battery modules are electrically connected to each other, (b) a pair of a front support member and a rear support member to cover the front and rear of outermost battery modules of the battery module assembly, (c) at least one upper end connection member to connect the front support member and the rear support member to each other at the upper end of the battery module assembly to support the upper part of the battery module assembly, and (d) at least one lower end connection member to connect the front support member and the rear support member to each other at the lower end of the battery module assembly to support the lower part of the battery module assembly, wherein the cartridge is provided at the lower end thereof with a fastening hole, via which the at least one lower end connection member is mounted.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to each other because high power and large capacity are necessary for the middle or large-sized devices.

Preferably, the middle or large-sized battery pack is manufactured so as to have as small a size and weight as possible. For this reason, a prismatic battery or a pouch-shaped battery, which can be stacked with high integration and has a small weight to capacity ratio, is usually used as a battery cell of the middle or large-sized battery pack. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery pack to provide power and capacity required by a predetermined apparatus or device, it is necessary for the middle or large-sized battery pack to be configured to have a structure in which a plurality of battery cells is electrically connected in series or in series and parallel to each other, and the battery cells are stable against external force.

Meanwhile, a conventional battery pack is configured to have a structure in which an appropriate number of battery modules are fixed to a base plate, an end plate, and a support bar to secure dynamic stability.

In the battery pack with the above-stated construction, however, there is a space restriction when the battery modules are mounted. Also, when a large number of battery modules are used to constitute the battery pack, overall structural stability of the battery pack is lowered.

Also, the conventional battery pack is configured such that the battery modules are fixed to the base plate using bolts or nuts to prevent upward and downward movement of the battery module, and the battery modules are fixed by the end plate and the support bar in the longitudinal direction, thereby secure dynamic stability.

In the battery pack with the above-stated construction, however, the battery modules are fixed to the base plate using bolts or nuts with the result that an assembly process is complex. Also, it is necessary to secure a space for the fastening members with the result that there is a space restriction and weight restriction of the fastening members.

Consequently, there is a high necessity for a battery pack having a compact structure that is capable of solving the above-mentioned problems.

DISCLOSURE

Technical Problem

Therefore, the present invention has been made to solve the above problems and other technical problems that have yet to be resolved.

Specifically, it is an object of the present invention to provide a battery pack which is compact and lightweight by minimizing the number of fastening members to fix battery modules.

It is another object of the present invention to provide a battery pack including a battery module assembly which exhibits high structural stability and can be easily assembled.

Technical Solution

In accordance with one aspect of the present invention, the above and other objects can be accomplished by the provision of a battery pack including (a) a battery module assembly having a structure in which two or more battery modules, each of which includes a plurality of unit modules, each of which includes two or more battery cells, mounted in a cartridge in a state in which the unit modules are connected in series and/or parallel to each other, are arranged in a lateral direction such that the battery modules are disposed in tight contact with each other or adjacent to each other in a state in which the battery modules are electrically connected to each other, (b) a pair of a front support member and a rear support member to cover the front and rear of outermost battery modules of the battery module assembly, (c) at least one upper end connection member to connect the front support member and the rear support member to each other at the upper end of the battery module assembly to support the upper part of the battery module assembly, and (d) at least one lower end connection member to connect the front support member and the rear support member to each other at the lower end of the battery module assembly to support the lower part of the battery module assembly, wherein the cartridge is provided at the lower end thereof with a fastening hole, via which the at least one lower end connection member is mounted.

In the battery pack according to the present invention, the battery module assemblies are coupled to the insides of the front support member and the rear support member using a minimum number of members. Consequently, it is possible to easily assemble the battery pack, to relatively optimize the space of the battery pack, and to reduce weight of the battery pack.

Also, in the battery pack with the above-stated construction, the battery module assembly may be fixed by a pair of a front support member and a rear support member, an upper end connection member, and a pair of lower end connection members. Consequently, it is possible to effectively prevent damage to the battery module assembly due to external force or vibration, thereby securing overall structural stability of the battery pack.

According to the circumstances, the front support member and the rear support member each may be provided at a central part thereof with a heat insulation member to prevent introduction of radiant heat into the battery cells.

In a preferred example, the at least one upper end connection member may include one member, and the at least one lower end connection member may include two members.

The at least one lower end connection member may be formed in the shape of a rod, preferably a hollow circular rod. In this structure, fastening screw threads may be formed at the inner circumferences of opposite ends of the rod. Consequently, the opposite ends of the at least one lower end connection member may be fastened using members, such as bolts, in a state in which the at least one lower end connection member is inserted through the fastening hole.

The front support member and the rear support member each may be provided at the upper end thereof with an upper end connection member through hole, through which the at least one upper end connection member is inserted and coupled. Consequently, it is possible to easily achieve connection between the at least one upper end connection member and the front support member and between the least one upper end connection member and the rear support member by inserting the at least one upper end connection member through the upper end connection member through holes of the front support member and the rear support member.

In a preferred example, the front support member and the rear support member each may be provided at the lower end thereof with a pair of lower end connection member through holes, through which the at least one lower end connection member is inserted and coupled. Consequently, it is possible to easily achieve connection between the at least one lower end connection member and the front support member and between the least one lower end connection member and the rear support member by inserting the at least one lower end connection member through the lower end connection member through holes of the front support member and the rear support member.

In the above structure, the at least one upper end connection member may be a frame member which is provided at opposite ends thereof with fastening holes, into which fastening members are inserted and coupled in a state in which the fastening holes communicate with the upper end connection member through holes. The opposite ends of the at least one upper end connection member may be tertiarily bent and welded such that each of the opposite ends of the at least one upper end connection member has a quadrangular shape in vertical section.

Also, each of the opposite ends of the at least one upper end connection member may have a vertical sectional structure configured in a hollow quadrangular shape in the longitudinal direction thereof. Consequently, the opposite ends of the at least one upper end connection member can be more stably mounted at the upper end of the battery module assembly.

Meanwhile, the cartridge may be configured to have a rectangular structure corresponding to the battery cells such that the battery cells are mounted in the cartridge, may be provided at a central part thereof with a heat dissipation opening, through which heat is dissipated, and may be provided at four corners thereof with unit module fastening holes, through which unit module fastening members to fix the unit modules are inserted.

Each of the unit module fastening members may include a hollow rod, which is inserted through a corresponding one of the unit module fastening holes, and a long bolt, which is inserted into the hollow rod.

Electrode terminals of the unit modules may be electrically connected to each other by bus bars. As needed, therefore, the electrode terminals of the unit modules may be connected in series and/or parallel to each other to provided desired power and capacity.

In the above structure, each of the bus bars may include a first terminal connection part, to which an external input and output terminal of a corresponding one of the battery modules is connected, and a second terminal connection part, to which the electrode terminals of the unit modules are connected.

The second terminal connection part may be divided into a plurality of pieces diverging from the first terminal connection part such that the second terminal connection part corresponds to the number of the unit modules. That is, it is possible to electrically connect a plurality of unit modules to each other using one bus bar, which is very preferable.

In a concrete example, the second terminal connection part may include a plate-shaped body connected to the first terminal connection part and a bent connection part bent vertically upward from the plate-shaped body such that the bent connection part is coupled to the electrode terminals of the unit modules by welding.

Also, the second terminal connection part may be provided with an external input and output terminal through hole, through which the external input and output terminal protrudes upward.

Meanwhile, an insulation member, having a bracket shape in longitudinal vertical section, may be mounted between cathode terminals and anode terminals of the unit modules at the top of each of the battery modules to prevent contact between the cathode terminals and the anode terminals of the unit modules. The at least one upper end connection member may be mounted in a depressed groove of the insulation member.

In the above structure of the insulation member, therefore, it is possible to effectively prevent contact between the electrode terminals due to external force or vibration, thereby securing overall structural stability of the battery pack.

Meanwhile, a bus bar assembly to electrically connect the battery modules in series to each other may be mounted at the upper end of the battery module assembly.

In the above structure, the bus bar assembly may include (a) a cover plate made of an electrically insulative material, the cover plate being mounted at the upper end of battery module assembly, (b) two or more conductive connection parts electrically connected to the external input and output terminals of the battery modules in a state in which the conductive connection parts are mounted on the cover plate, and (c) two or more bus bars mounted at the upper end of the cover plate in a direction perpendicular to a direction in which the battery modules are arranged to electrically connect the conductive connection parts of the battery modules to each other.

Preferably, sensing members to measure voltages of the battery modules are mounted at the upper end of the cover plate such that the sensing members are electrically connected to the conductive connection parts.

The conductive connection parts may include first conductive connection parts electrically connected to the external input and output terminals of the battery modules and the sensing members and second conductive connection parts electrically connected to corresponding ends of the bus bars.

In the above structure, fastening holes, through which the external input and output terminals are inserted and coupled, may be formed in the first conductive connection parts. Consequently, it is possible to achieve electrical connection between the external input and output terminals and the conductive connection parts.

Each of the sensing members may include a terminal connection part coupled to the upper end of a corresponding one of the first conductive connection parts to sense voltage, a connector to transmit the voltage sensed by the terminal connection part to a controller, and a wire to connect the terminal connection part to the connector.

Each of the battery cells may be a pouch-shaped battery cell having an electrode assembly mounted in a case made of a laminate sheet comprising a resin layer and a metal layer. Preferably, each of the battery cells is a pouch-shaped lithium secondary battery. Also, both electrode terminals of each of the battery cells may be formed at the upper part or the lower part of the case.

The battery pack according to the present invention generally has a compact structure, and structurally stable mechanical fastening and electrical connection are achieved without using a large number of members. Also, a predetermined number, such as 4, 6, 8, or 10, of battery modules may constitute a battery pack, and therefore, it is possible to effectively mount a necessary number of battery packs in a limited space.

The battery pack according to the present invention may be manufactured by combining battery modules based on desired power and capacity. In consideration of installation efficiency and structural stability as previously described, the battery pack according to the present invention is preferably used as a power source for electric vehicles, hybrid electric vehicles, plug-in hybrid electric vehicles, or power storage devices. However, the application range of the battery pack is not limited thereto.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
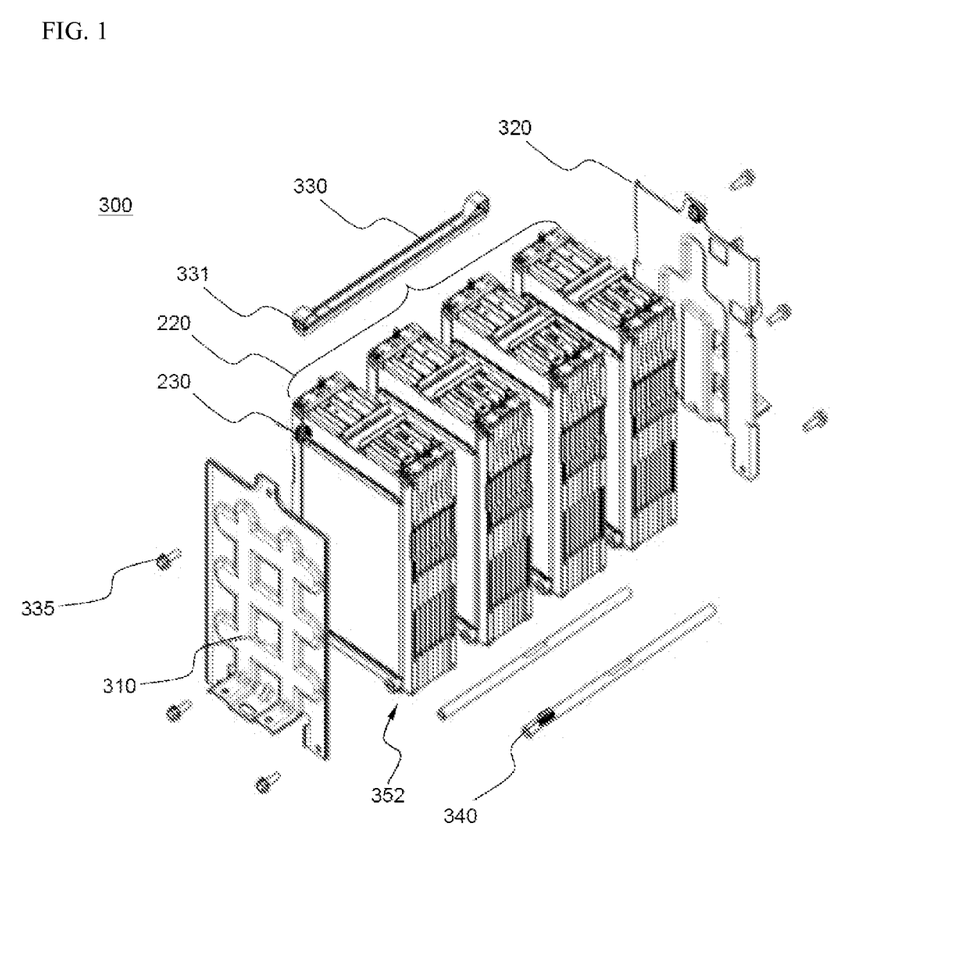
FIG. 1 is an exploded perspective view showing a battery pack according to an embodiment of the present invention.
Figure 2:
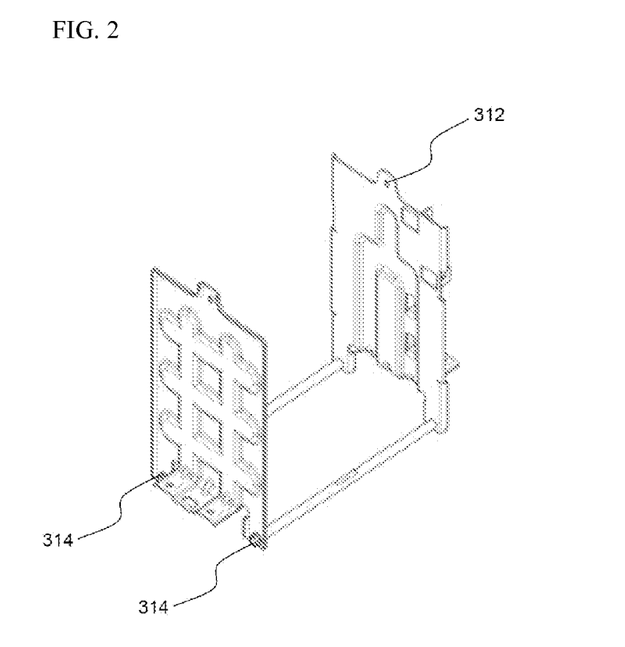
FIGS. 2 and 3 are perspective views showing a process in which battery modules are mounted to lower end connection members of FIG. 1.
Figure 3:
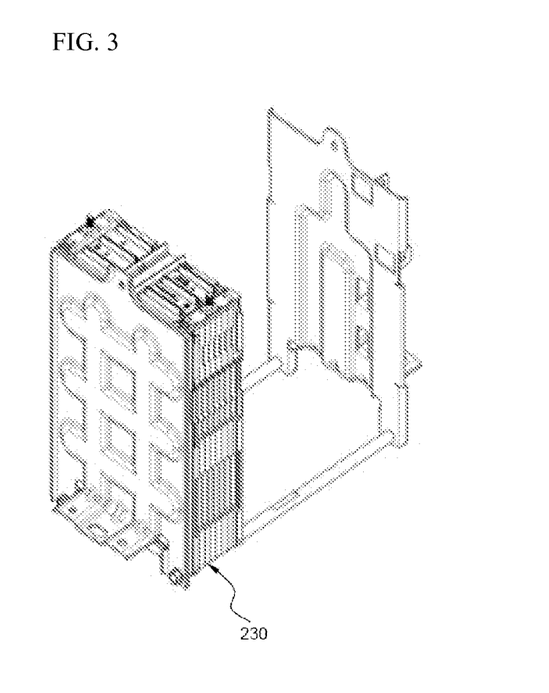

FIG. 1 is an exploded perspective view typically showing a battery pack according to an embodiment of the present invention, and FIGS. 2 and 3 are perspective views typically showing a process in which battery modules are mounted to lower end connection members of FIG. 1.

Referring to these drawings, a battery pack 300 includes a battery module assembly 220, a pair of a front support member 310 and a rear support member 320, an upper end connection member 330, and a pair of lower end connection members 340.

The battery module assembly 220 is configured to have a structure in which four battery modules 230, each of which includes a plurality of unit modules, each of which includes three battery cells, mounted in a cartridge 350 in a state in which the unit modules are connected in series and/or parallel to each other, are arranged in the lateral direction such that the battery modules 230 are disposed in tight contact with each other in a state in which the battery modules 230 are electrically connected to each other.

The front support member 310 and the rear support member 320 cover the front and the rear of the outermost battery modules of the battery module assembly 220. The upper end connection member 330 connects the front support member 310 and the rear support member 320 to each other at the upper end of the battery module assembly 220 to support the upper part of the battery module assembly 220.

Also, the lower end connection members 340 connect the front support member 310 and the rear support member 320 to each other at the lower end of the battery module assembly 220 to support the lower part of the battery module assembly 220.

At the upper end of the front support member 310 is formed an upper end connection member through hole 312, through which the upper end connection member 330 is inserted and coupled. At the upper end of the rear support member 320 is also formed another upper end connection member through hole 312, through which the upper end connection member 330 is inserted and coupled. At opposite sides of the lower end of the front support member 310 is formed a pair of lower end connection member through holes 314, through which the lower end connection members 340 are inserted and coupled. At opposite sides of the lower end of the rear support member 320 is also formed another pair of lower end connection member through holes 314, through which the lower end connection members 340 are inserted and coupled.

The upper end connection member 330, which is a frame member, is provided at opposite ends thereof with fastening holes 331, into which fastening members 335 are inserted and coupled in a state in which the fastening holes 331 communicate with the upper end connection member through holes 312.

The opposite ends of the upper end connection member 330 are welded such that each of the opposite ends of the upper end connection member 330 has a quadrangular shape in section. The vertical sectional structure of the upper end connection member 330 in the longitudinal direction thereof is configured to have a hollow quadrangular shape.

Figure 4:
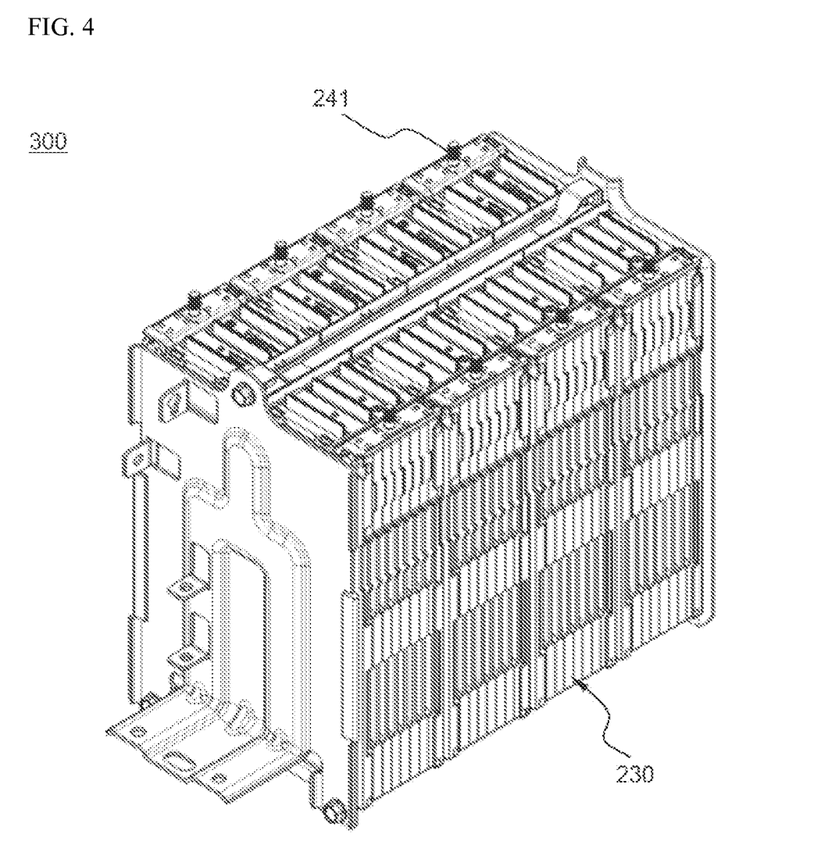
FIG. 4 is an assembled view of the battery pack of FIG. 1.
Figure 5:
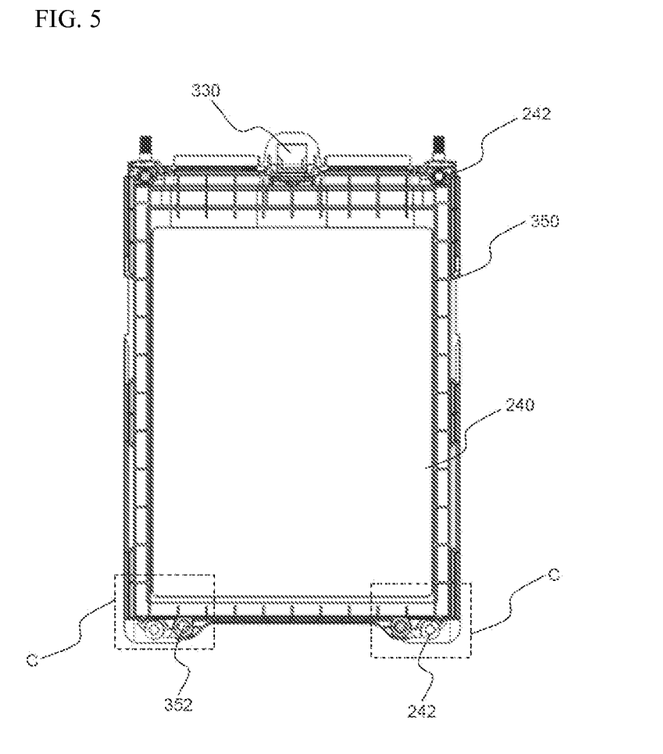
FIG. 5 is a sectional view typically showing a structure in which a battery cell is mounted in a cartridge.
Figure 6:
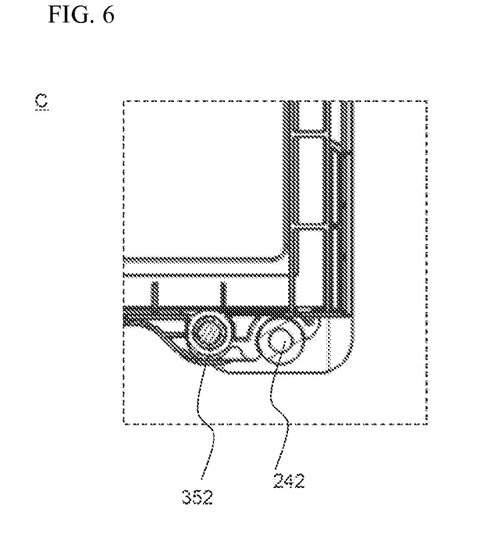
FIG. 6 is an enlarged sectional view typically showing a part C of FIG. 5.

FIG. 4 is a view typically showing the battery pack of FIG. 1, FIG. 5 is a sectional view typically showing a structure in which battery cells are mounted in a cartridge, and FIG. 6 is a partially enlarged sectional view typically showing the lower end of the cartridge (part C) of FIG. 5.

Referring to these drawings together with FIG. 1, the cartridge 350 is provided at opposite sides of the lower end thereof with through holes 352, through which the lower end connection members 340 are inserted and coupled. Each of the lower end connection members 340 is formed in the shape of a rod, at inner circumferences of opposite ends of which fastening screw threads (not shown) are formed.

Also, the cartridge 350 is configured to have a rectangular structure corresponding to the shape of a unit module 240, which includes three battery cells, such that the unit module 240 is mounted in the cartridge 350. The cartridge 350 is provided at the central part thereof with a heat dissipation opening, through which heat is dissipated. Also, the cartridge 350 is provided at four corners thereof with unit module fastening holes 242, through which unit module fastening members (not shown) to fix the unit modules 240 are inserted.

Consequently, it is possible to easily assemble the battery module assembly between the front support member and the rear support member, thereby optimizing space utilization of the battery pack and reducing weight of the battery pack.

Figure 7:
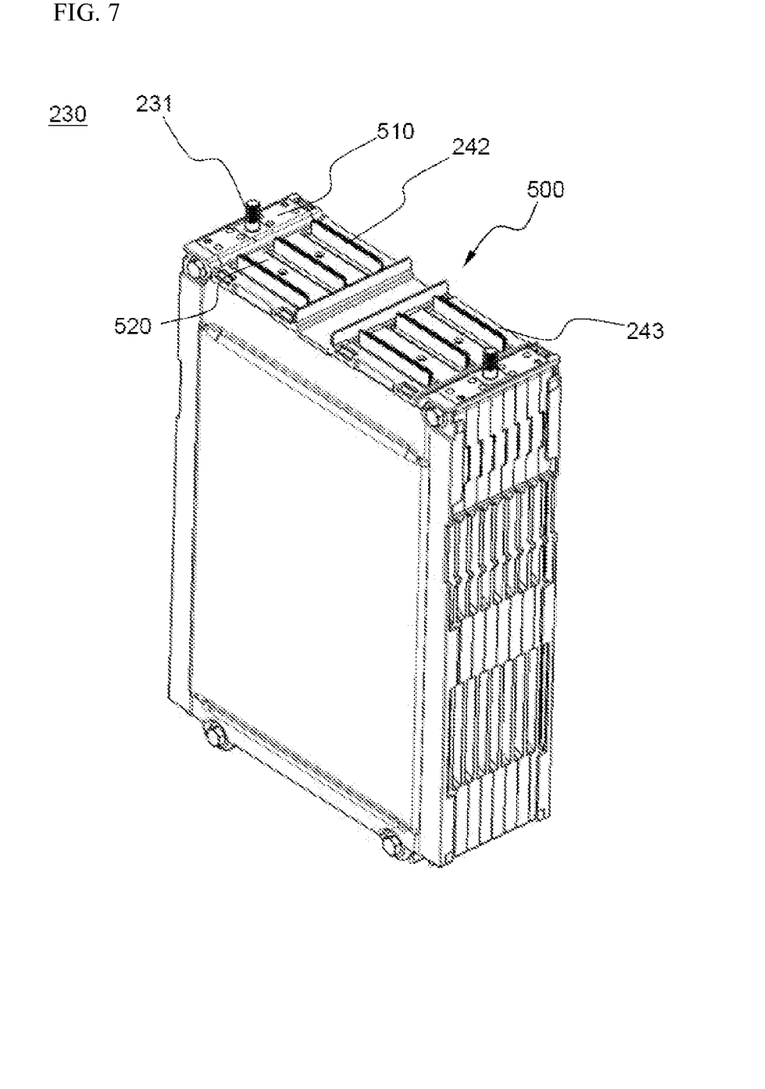
FIG. 7 is a plan view typically showing a battery module of FIG. 1.
Figure 8:
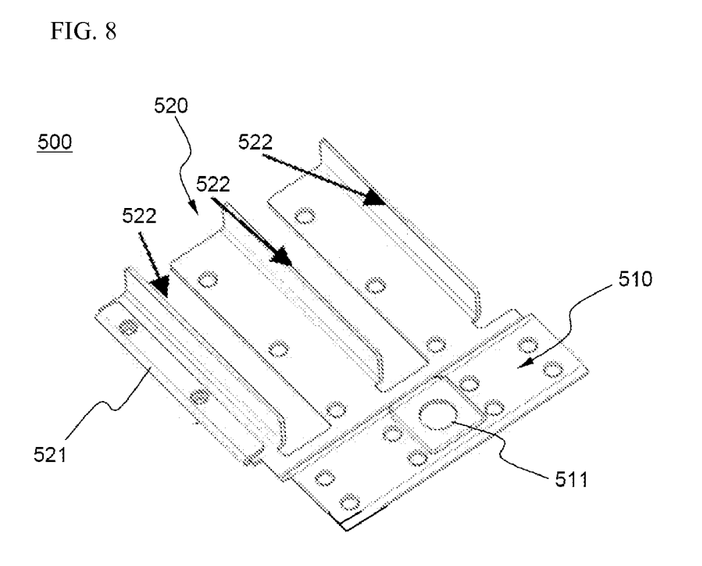
FIG. 8 is an enlarged perspective view showing a bus bar of FIG. 7.
Figure 9:
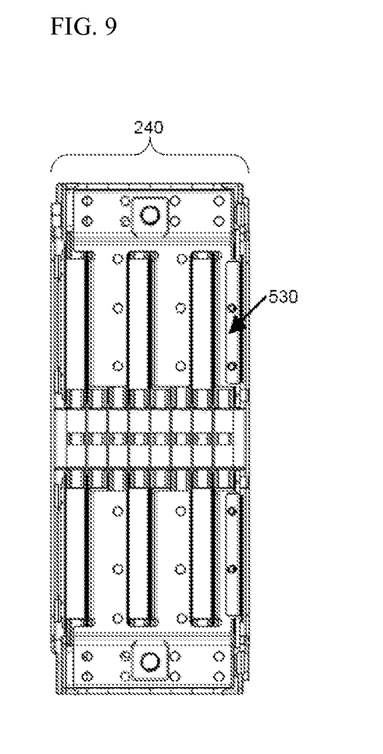
FIGS. 9 and 10 are a plan view and a perspective view showing a coupled state between the bus bar and an insulation member.
Figure 10:
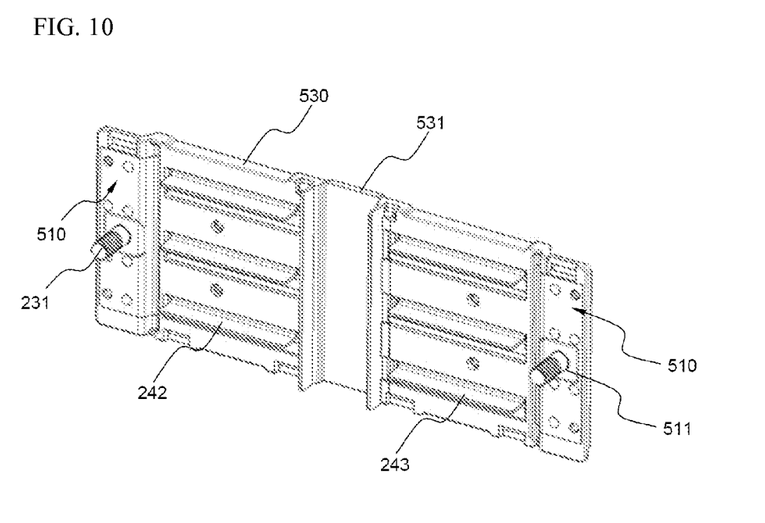

FIG. 7 is a perspective view typically showing one of the battery modules of FIG. 4, FIG. 8 is a perspective view typically showing a bus bar of FIG. 7, and FIGS. 9 and 10 are a plan view and a perspective view typically showing a coupled state between bus bars and an insulation member.

Referring to these drawings together with FIG. 5, electrode terminals of the unit modules 240 are electrically connected to each other by bus bars 500.

Each of the bus bars 500 includes a first terminal connection part 510, to which an external input and output terminal 231 of the battery module 230 is connected, and a second terminal connection part 520, to which electrode terminals 242 and 243 of the unit modules 240 are connected.

The second terminal connection part 520 is divided into three pieces diverging from the first terminal connection part 510 such that the second terminal connection part 520 corresponds to the three unit modules 240. Consequently, it is possible to electrically connect a plurality of unit modules to each other using one bus bar.

Also, each piece of the second terminal connection part 520 includes a plate-shaped body 521 connected to the first terminal connection part 510 and a bent connection part 522 bent vertically upward from the plate-shaped body 521 such that the bent connection part 522 is coupled to the electrode terminals of the unit modules 240 by welding.

The first terminal connection part 510 is provided with an external input and output terminal through hole 511, through which the external input and output terminal 231 protrudes upward.

Also, an insulation member 530, having a bracket shape in longitudinal vertical section, is mounted between the cathode terminals 242 and the anode terminals 243 of the unit modules 240 at the top of the battery module 230 to prevent contact between the cathode terminals 242 and the anode terminals 243 of the unit modules 240. The upper end connection member 330 is mounted in a depressed groove 531 of the insulation member 530.

Figure 11:
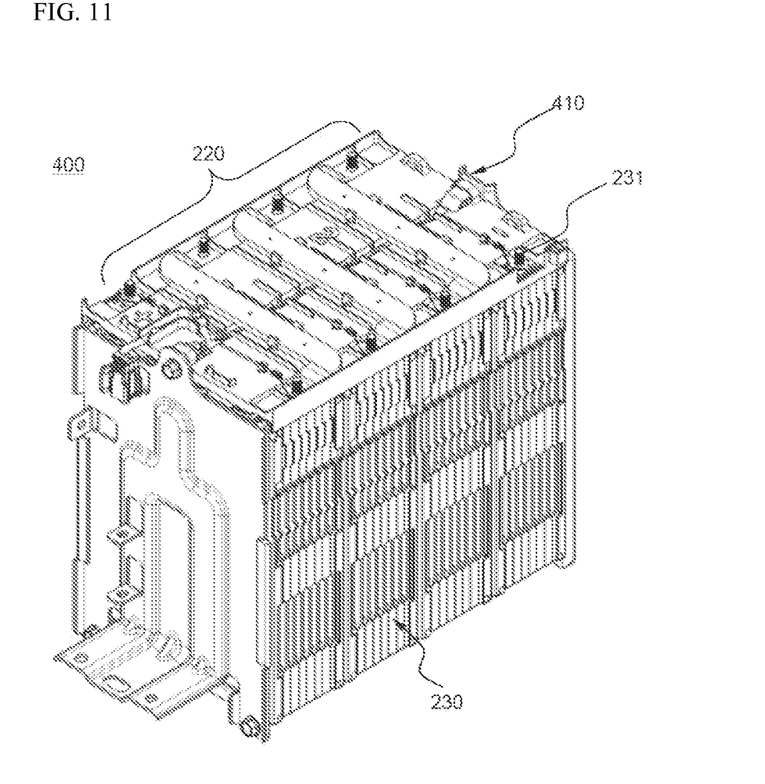
FIG. 11 is a perspective view showing a battery pack according to another embodiment of the present invention.
Figure 12:
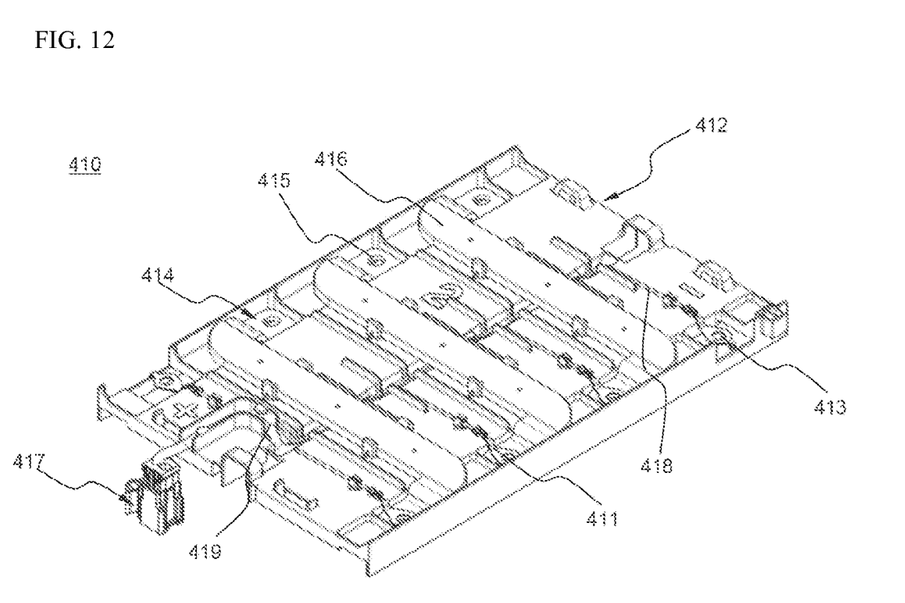
FIG. 12 is an enlarged perspective view showing a bus bar assembly of FIG. 11.

FIG. 11 is a perspective view typically showing a structure in which a bus bar assembly is mounted at the upper end of the battery module assembly of FIG. 1, and FIG. 12 is an enlarged perspective view typically showing the bus bar assembly of FIG. 11.

Referring to these drawings, a bus bar assembly 410 to electrically connect the battery modules 230 in series to each other is mounted at the upper end of the battery module assembly 220.

The bus bar assembly 410 includes a cover plate 412 made of an electrically insulative material, six conductive connection parts 414, and three bus bars 416 for battery modules.

Also, the conductive connection parts 414 are electrically connected to the external input and output terminals 231 of the battery modules 230 in a state in which the conductive connection parts 414 are mounted on the cover plate 412. The bus bars 416 are mounted at the upper end of the cover plate 412 in a direction perpendicular to the direction in which the battery modules 230 are arranged to electrically connect the conductive connection parts 414 of the battery modules 230 to each other.

Sensing members 418 to measure voltages of the battery modules 230 are mounted at the upper end of the cover plate 412 such that the sensing members 418 are electrically connected to the conductive connection parts 414. The conductive connection parts 414 include first conductive connection parts 411 electrically connected to the external input and output terminals 231 of the battery modules 230 and the sensing members 418 and second conductive connection parts (not shown) electrically connected to corresponding ends of the bus bars 416.

Also, fastening holes 415, through which the external input and output terminals 231 of the battery modules 230 are inserted and coupled, are formed in the first conductive connection parts 411.

Each of the sensing members 418 includes a terminal connection part 413 coupled to the upper end of a corresponding one of the first conductive connection parts 411 to sense voltage, a connector 417 to transmit the voltage sensed by the terminal connection part 413 to a controller (not shown), and a wire 419 to connect the terminal connection part 413 to the connector 417.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery pack according to the present invention is configured such that the upper end connection member and the lower end connection members are mounted to the front support member and the rear support member. Consequently, it is possible to easily assemble the battery pack, to minimize weight of the battery pack, and to manufacture a battery pack exhibiting high space utilization.

In addition, the battery module assembly constituting the battery pack according to the present invention is compact, exhibits excellent structural safety, and can be easily assembled.

The invention claimed is:

1. A battery pack comprising:
   (a) a battery module assembly having a structure in which two or more battery modules, each of which comprises a plurality of unit modules, each of which comprises two or more battery cells, mounted in a cartridge in a state in which the unit modules are connected in (i) series or (ii) parallel or (iii) series and parallel to each other, are arranged in a lateral direction such that the battery modules are disposed in tight contact with each other or adjacent to each other in a state in which the battery modules are electrically connected to each other;
   (b) a pair of a front support member and a rear support member to cover a front and rear of outermost battery modules of the battery module assembly;
   (c) at least one upper end connection member to connect the front support member and the rear support member to each other at an upper end of the battery module assembly to support an upper part of the battery module assembly; and
   (d) at least one lower end connection member to connect the front support member and the rear support member to each other at a lower end of the battery module assembly to support a lower part of the battery module assembly, wherein
   the cartridge is provided at a lower end thereof with a fastening hole, via which the at least one lower end connection member is mounted,
   an insulation member is mounted between cathode terminals and anode terminals of the unit modules at a top of each of the battery modules to prevent contact between the cathode terminals and the anode terminals of the unit modules, and
   the upper end connection member is mounted in a depressed groove of the insulation member.

2. The battery pack according to claim 1, wherein the at least one lower end connection member is formed in the shape of a rod, at inner circumferences of opposite ends of which fastening screw threads are formed.

3. The battery pack according to claim 1, wherein the front support member and the rear support member each are provided at an upper end thereof with an upper end connection member through hole, through which the at least one upper end connection member is inserted and coupled.

4. The battery pack according to claim 1, wherein the front support member and the rear support member each are provided at a lower end thereof with a pair of lower end connection member through holes, through which the at least one lower end connection member is inserted and coupled.

5. The battery pack according to claim 3, wherein the at least one upper end connection member is a frame member which is provided at opposite ends thereof with fastening holes, into which fastening members are inserted and coupled in a state in which the fastening holes communicate with the upper end connection member through holes.

6. The battery pack according to claim 5, wherein each of the opposite ends of the at least one upper end connection member has a vertical sectional structure configured in a hollow quadrangular shape in a longitudinal direction thereof.

7. The battery pack according to claim 1, wherein the cartridge is configured to have a rectangular structure corresponding to the battery cells such that the battery cells are mounted in the cartridge, is provided at a central part thereof with a heat dissipation opening, through which heat is dissipated, and is provided at four corners thereof with unit module fastening holes, through which unit module fastening members to fix the unit modules are inserted.

8. The battery pack according to claim 1, wherein electrode terminals of the unit modules are electrically connected to each other by bus bars.

9. The battery pack according to claim 8, wherein each of the bus bars comprises a first terminal connection part, to which an external input and output terminal of a corresponding one of the battery modules is connected, and a second terminal connection part, to which electrode terminals of the unit modules are connected.

10. The battery pack according to claim 9, wherein the second terminal connection part is divided into a plurality of pieces diverging from the first terminal connection part such that the second terminal connection part corresponds to the number of the unit modules.

11. The battery pack according to claim 9, wherein the second terminal connection part comprises a plate-shaped body connected to the first terminal connection part and a bent connection part bent vertically upward from the plate-shaped body such that the bent connection part is coupled to the electrode terminals of the unit modules by welding.

12. The battery pack according to claim 9, wherein the first terminal connection part is provided with an external input and output terminal through hole, through which the external input and output terminal protrudes upward.

13. The battery pack according to claim 1, wherein an insulation member has a bracket shape in longitudinal vertical section.

14. The battery pack according to claim 1, wherein a bus bar assembly to electrically connect the battery modules in series to each other is mounted at the upper end of the battery module assembly.

15. The battery pack according to claim 14, wherein the bus bar assembly comprises:
   (a) a cover plate made of an electrically insulative material, the cover plate being mounted at the upper end of battery module assembly;
   (b) two or more conductive connection parts electrically connected to external input and output terminals of the battery modules in a state in which the conductive connection parts are mounted on the cover plate; and
   (c) two or more bus bars mounted at an upper end of the cover plate in a direction perpendicular to a direction in which the battery modules are arranged to electrically connect the conductive connection parts of the battery modules to each other.

16. The battery pack according to claim 15, wherein sensing members to measure voltages of the battery modules are mounted at the upper end of the cover plate such that the sensing members are electrically connected to the conductive connection parts.

17. The battery pack according to claim 16, wherein the conductive connection parts comprise first conductive connection parts electrically connected to the external input and output terminals of the battery modules and the sensing members and second conductive connection parts electrically connected to corresponding ends of the bus bars.

18. The battery pack according to claim 17, wherein fastening holes, through which the external input and output terminals are inserted and coupled, are formed in the first conductive connection parts.

19. The battery pack according to claim 17, wherein each of the sensing members comprises a terminal connection part coupled to an upper end of a corresponding one of the first conductive connection parts to sense voltage, a connector to transmit the voltage sensed by the terminal connection part to a controller, and a wire to connect the terminal connection part to the connector.

20. The battery pack according to claim 1, wherein each of the battery cells is a pouch-shaped battery cell having an electrode assembly mounted in a case made of a laminate sheet comprising a resin layer and a metal layer.

21. The battery pack according to claim 20, wherein the battery pack is used as a power source for electric vehicles, hybrid electric vehicles, plug-in hybrid electric vehicles, or power storage devices.

* * * * *